United States Patent
Xiao et al.

(10) Patent No.: US 11,964,700 B2
(45) Date of Patent: Apr. 23, 2024

(54) LIGHTWEIGHT ALUMINUM ALLOY CARRIAGE

(71) Applicant: Fujian Minlu Lightweight Automobile Manufacturing Co., Ltd., Fujian (CN)

(72) Inventors: Kaizheng Xiao, Fujian (CN); Xiang Li, Fujian (CN); Donggui Zhang, Fujian (CN); Yongda Fan, Fujian (CN)

(73) Assignee: Fujian Minlu Lightweight Automobile Manufacturing Co., Ltd., Nanping (CN)

( * ) Notice: Subject to any disclaimer, the term of this patent is extended or adjusted under 35 U.S.C. 154(b) by 677 days.

(21) Appl. No.: 17/178,752

(22) Filed: Feb. 18, 2021

(65) Prior Publication Data

US 2021/0261327 A1 Aug. 26, 2021

(30) Foreign Application Priority Data

Feb. 21, 2020 (CN) .......................... 202010107460.X (51) Int. Cl.
*B62D 29/00* (2006.01)
*B62D 25/20* (2006.01)

(52) U.S. Cl.
CPC ....... *B62D 29/008* (2013.01); *B62D 25/2054* (2013.01); *B62D 25/2036* (2013.01); *B65D 2588/12* (2013.01)

(58) Field of Classification Search
CPC .... B62D 21/10; B62D 25/20; B62D 25/2054; B62D 29/008; B62D 33/02; B62D 63/06; B65D 88/12; B65D 2588/12
USPC ........................................... 296/193.07, 204
See application file for complete search history.

(56) References Cited

U.S. PATENT DOCUMENTS

| | | | | |
|---|---|---|---|---|
| 5,401,050 A | * | 3/1995 | Baker | B62D 53/061 280/789 |
| 6,283,538 B1 | * | 9/2001 | Reitnouer | B62D 33/02 296/184.1 |
| 7,798,558 B2 | * | 9/2010 | Messier | B62D 25/2054 296/184.1 |
| 8,474,871 B1 | * | 7/2013 | Ludwick | B62D 21/09 280/789 |
| 11,148,722 B2 | * | 10/2021 | Garceau | B62D 29/04 |

(Continued)

FOREIGN PATENT DOCUMENTS

| | | | | | |
|---|---|---|---|---|---|
| CN | 108545118 A | * | 9/2018 | ........... | B62D 29/008 |
| DE | 202012102217 U1 | * | 11/2013 | ......... | B62D 25/2054 |

*Primary Examiner* — Jason S Daniels
(74) *Attorney, Agent, or Firm* — MagStone Law, LLP; Enshan Hong (57) ABSTRACT

Provided is a lightweight aluminum alloy carriage, which relates to the field of lightweight logistics equipment manufacturing application. The lightweight aluminum alloy carriage comprises a bottom plate assembly, and the bottom plate assembly comprises a front end part and a rear end part which are arranged front and back on an axis; the front end part comprises a transversely arranged aluminum alloy profile bottom plate, and the extrusion direction of the transversely arranged aluminum alloy profile bottom plate is perpendicular to the axis of the bottom plate assembly; and the rear end part comprises aluminum alloy square tube cross beams and a longitudinally arranged aluminum alloy profile bottom plate, and the aluminum alloy square tube cross beams are perpendicular to the axis of the bottom plate assembly.

10 Claims, 6 Drawing Sheets

(56) References Cited

U.S. PATENT DOCUMENTS

| | | | | |
|---|---|---|---|---|
| 11,554,711 B2* | 1/2023 | Noble | ................. | B60P 7/14 |
| 2006/0087152 A1* | 4/2006 | Kuriakose | .......... | B62D 25/2054 |
| | | | | 296/184.1 |
| 2010/0313422 A1* | 12/2010 | Booher | ................ | B62D 27/023 |
| | | | | 29/897.2 |
| 2021/0129918 A1* | 5/2021 | Adams | ............... | B62D 25/2054 |

* cited by examiner

LIGHTWEIGHT ALUMINUM ALLOY CARRIAGE

RELATED APPLICATIONS

This application claims the priority from China Patent Application Serial Number 202010107460.X, filed on Feb. 21, 2020, the content of which is incorporated here by reference.

BACKGROUND OF THE INVENTION

1. Technical Field

The present disclosure relates to the field of lightweight logistics equipment manufacturing application, in particular to a lightweight aluminum alloy carriage.

2. Description of the Related Art

In recent years, the logistics industry and the like are gradually changed along with the large development of national economy, and particularly, how to load more goods on the premise of meeting laws and regulations is the most critical problem of improving the transportation efficiency under strict execution of national overload treatment. At present, common logistics carriages are generally formed by splicing high-strength steel or a small amount of aluminum alloy through longitudinal beams, cross beams and connecting corner fittings, although the structure further reduces the weight of the carriage and improves the loading capacity of the carriage on the premise of ensuring the structural stability of the carriage, and from the aspects of the production process and the putting and using conditions of the carriage, the carriage is short in service life, high in relative cost and low in part assembling, disassembling and replacing efficiency in use, is still limited to a traditional design idea that plates are weak and beams are strong, and is not beneficial to development and popularization of light weight, energy conservation and emission reduction of logistics vehicles.

SUMMARY OF THE INVENTION

The technical problem to be solved by the present disclosure is to provide a lightweight aluminum alloy carriage which improves the production efficiency.

In order to solve the technical problem, the technical scheme adopted by the present disclosure is as follows: the lightweight aluminum alloy carriage comprises a bottom plate assembly, and the bottom plate assembly comprises a front end part and a rear end part which are arranged front and back on the axis;

the front end part comprises a transversely arranged aluminum alloy profile bottom plate, and the extrusion direction of the transversely arranged aluminum alloy profile bottom plate is perpendicular to the axis of the bottom plate assembly; and the rear end part comprises aluminum alloy square tube cross beams and a longitudinally arranged aluminum alloy profile bottom plate, the aluminum alloy square tube cross beams are perpendicular to the axis of the bottom plate assembly, the extrusion direction of the longitudinally arranged aluminum alloy profile bottom plate is parallel to the axis of the bottom plate assembly, the longitudinally arranged aluminum alloy profile bottom plate is erected on the aluminum alloy square tube cross beams, and the aluminum alloy square tube cross beams are connected with the transversely arranged aluminum alloy profile bottom plate.

The lightweight aluminum alloy carriage has the beneficial effects that the provided lightweight aluminum alloy carriage comprises a bottom plate assembly, compared with a traditional structure that an upper berth bottom plate is supported by bottom cross beams and bottom longitudinal beams in a staggered mode, the bottom plate assembly comprises a front end part and a rear end part which are arranged front and back on the axis, the front end part is designed to be of a cross-beam-free transverse berth bottom plate structure; one-time formed extruded aluminum alloy profiles are adopted, the function and strength requirements of the cross beams and the bottom plate are met, the process difficulty of production and manufacturing is greatly reduced, the production cycle is shortened, the carriage combination efficiency is improved, particularly under the conditions that the overall lightweight design effect of the carriage is better and the cargo carrying capacity is equivalent, the carriage is greatly lightened, the logistics transportation efficiency is greatly improved, the rear end part adopts the structure that the square tube cross beams are erected on the longitudinally arranged profile bottom plate, and the square tube cross beams are used on the carriage for the first time, so that better lightweight design conditions are brought, and the carriage has the advantage that the carriage is easy in production, processing and installation; moreover, the stability of a rear section structure of the carriage is improved; and in cooperation with the longitudinally arranged aluminum alloy profile bottom plate, the loading capacity and the anti-deformation and anti-impact capacity of the carriage are improved, and the safety is guaranteed while the logistics transportation efficiency is improved.

REFERENCE SIGNS 1, bottom plate assembly;
2, front end part; 21, transversely arranged aluminum alloy profile bottom plate; 211, transversely arranged aluminum alloy profile; 212, separation rib; 22, aluminum alloy transverse frame;

3, rear end part; 31, aluminum alloy square tube cross beam; 32, longitudinally arranged aluminum alloy profile bottom plate; 321, longitudinally arranged aluminum alloy profile; 322, supporting rib; 33, bottom edge beam;

4, inclined connecting part; 41, first bent plate; 42, second bent plate; 43, inclined aluminum alloy profile; 44, aluminum alloy inclined frame;

5, side wall assembly; 51, upper edge beam; 52, front-section lower edge beam; 53, middle-section lower edge beam; 54, rear-section lower edge beam; 55, side wall plate; 56, steel door frame; 57, aluminum alloy profile door plate;

6, front wall assembly;

7, rear wall assembly; and 8, top girth assembly.

DETAILED DESCRIPTION OF PREFERRED EMBODIMENTS

In order to explain the technical content, objects and effects of the present disclosure in detail, the following description is taken in combination with the embodiments and in conjunction with the accompanying drawings.

Referring to FIG. 1 to FIG. 10, a lightweight aluminum alloy carriage comprises a bottom plate assembly, and the bottom plate assembly comprises a front end part and a rear end part which are arranged front and back on an axis;

the front end part comprises a transversely arranged aluminum alloy profile bottom plate, and the extrusion direction of the transversely arranged aluminum alloy profile bottom plate is perpendicular to the axis of the bottom plate assembly; and the rear end part comprises aluminum alloy square tube cross beams and a longitudinally arranged aluminum alloy profile bottom plate, the aluminum alloy square tube cross beams are perpendicular to the axis of the bottom plate assembly, the extrusion direction of the longitudinally arranged aluminum alloy profile bottom plate is parallel to the axis of the bottom plate assembly, the longitudinally arranged aluminum alloy profile bottom plate is erected on the aluminum alloy square tube cross beams, and the aluminum alloy square tube cross beams are connected with the transversely arranged aluminum alloy profile bottom plate.

It can be known from the description that the lightweight aluminum alloy carriage has the beneficial effects that compared with a traditional structure that an upper berth bottom plate is supported by bottom cross beams and bottom longitudinal beams in a staggered mode, the bottom plate assembly comprises a front end part and a rear end part which are arranged front and back on the axis, the front end part is designed to be of a cross-beam-free transverse berth bottom plate structure; one-time formed extruded aluminum alloy profiles are adopted, the function and strength requirements of the cross beams and the bottom plate are met, the process difficulty of production and manufacturing is greatly reduced, the production cycle is shortened, the carriage combination efficiency is improved, particularly under the conditions that the overall lightweight design effect of the carriage is better and the cargo carrying capacity is equivalent, the carriage is greatly lightened, the logistics transportation efficiency is greatly improved, the rear end part adopts the structure that the square tube cross beams are erected on the longitudinally arranged profile bottom plate, and the square tube cross beams are used on the carriage for the first time, so that better lightweight design conditions are brought, and the carriage has the advantage that the carriage is easy in production, processing and installation; moreover, the stability of a rear section structure of the carriage is improved; and in cooperation with the longitudinally arranged aluminum alloy profile bottom plate, the loading capacity and the anti-deformation and anti-impact capacity of the carriage are improved, and the safety is guaranteed while the logistics transportation efficiency is improved.

Further, the transversely arranged aluminum alloy profile bottom plate comprises two or more sets of transversely arranged aluminum alloy profiles which are sequentially spliced along the axis of the bottom plate assembly, and the longitudinally arranged aluminum alloy profile bottom plate comprises two or more sets of longitudinally arranged aluminum alloy profiles which are sequentially spliced along the axis perpendicular to the bottom plate assembly.

It can be known from the description that the transversely arranged profile bottom plate and the longitudinally arranged profile bottom plate are formed by mutually splicing the aluminum alloy profiles with profile sections subjected to special design, the two kinds of aluminum alloy profiles with the extrusion directions perpendicular to each other are used for the front end part and the rear end part of the carriage respectively, the stress conditions of the front end part and the rear end part of the carriage are improved while the lightweight design purpose is achieved, and the overall loading capacity and the anti-impact and anti-deformation capacity of the carriage are improved.

Further, an inner cavity of each set of transversely arranged aluminum alloy profiles is separated into two or more independent cavities through separation ribs.

It can be known from the description that an inner cavity of each set of transversely arranged aluminum alloy profiles comprises a plurality of independent cavities, and the lightweight effect of the front end of the carriage is further improved while the loading capacity of the profiles is met.

Further, each set of longitudinally arranged aluminum alloy profiles comprises a supporting plate and supporting ribs arranged on the end face, facing the aluminum alloy square tube cross beams, of the supporting plate.

It can be known from the description that the longitudinally arranged aluminum alloy profiles adopt the structural design that the supporting plate is fixed to the square tube cross beams through the supporting ribs, the weight of the rear end part of the carriage is greatly reduced, the structure is stable, and the rear section of the carriage is easy to install.

Further, the front end part and the rear end part are arranged in a stepped surface mode, the front end part is located on the high surface of the stepped surface, the rear end part is located on the low surface of the stepped surface, and the front end part is connected with the rear end part through an inclined connecting part.

It can be known from the description that the front end part and the rear end part form the stepped surface and are connected through the inclined connecting part, so that compared with a traditional vertical transition connecting structure, a loading and unloading trolley can conveniently pass through the stepped surface during cargo loading and unloading, more importantly, the volume in the box can be increased so as to increase the loading space, and then the logistics transportation efficiency is improved.

Further, the inclined connecting part comprises a first bent plate, a second bent plate and two or more sets of inclined aluminum alloy profiles spliced end to end, the extrusion directions of the inclined aluminum alloy profiles are perpendicular to the axis of the bottom plate assembly, the transversely arranged aluminum alloy profiles are connected with one set of inclined aluminum alloy profiles through the first bent plate, and the longitudinally arranged aluminum alloy profiles are connected with the other set of inclined aluminum alloy profiles through the second bent plate.

It can be known from the description that the inclined aluminum alloy profiles and the transversely arranged aluminum alloy profiles are the same and are easy to produce and replace, the inclined aluminum alloy profiles are connected with the transversely arranged aluminum alloy profiles and the longitudinally arranged aluminum alloy profiles through the two bent plates, the structure is stable, and assembling and disassembling are rapid.

Further, the inclined connecting part further comprises an aluminum alloy inclined frame, the front end part further comprises an aluminum alloy transverse frame arranged at the ends, close to the inclined connecting part, of the transversely arranged aluminum alloy profiles, one end of the aluminum alloy inclined frame is connected with the aluminum alloy transverse frame, the other end of the aluminum alloy inclined frame is connected with the aluminum alloy square tube cross beams, and the inclined aluminum alloy profiles are erected on the aluminum alloy inclined frame.

It can be known from the description that the aluminum alloy inclined frame is supported below the inclined aluminum alloy profiles, and the effects of connecting the front section and the rear section of the carriage and improving the loading capacity of the carriage are achieved.

Further, the rear end part further comprises bottom edge beams, the two ends, perpendicular to the axis of the bottom plate assembly, of the longitudinally arranged aluminum alloy profile bottom plate are erected on the two parallel bottom edge beams respectively, and the two ends of the aluminum alloy square tube cross beams are erected on the two bottom edge beams respectively.

It can be known from the description that the bottom edge beams are used for fixing the longitudinally arranged aluminum alloy profile bottom plate and the aluminum alloy square tube cross beams, and the effects of supporting protection and installation simplification are achieved.

Further, the lightweight aluminum alloy carriage further comprises side wall assemblies, each side wall assembly comprises an upper edge beam, a front-section lower edge beam, a middle-section lower edge beam, a rear-section lower edge beam and a side wall plate, the front-section lower edge beam is arranged at the end, perpendicular to the axis of the bottom plate assembly, of the front end part, the rear-section lower edge beam is arranged at the end, perpendicular to the axis of the bottom plate assembly, of the rear end part, the middle-section lower edge beam is arranged at the end, perpendicular to the axis of the bottom plate assembly, of the inclined connecting part, the two ends of the middle-section lower edge beam are connected with the front-section lower edge beam and the rear-section lower edge beam respectively, the side wall plate is parallel to the axis of the bottom plate assembly, the bottom of the side wall plate is connected with the front-section lower edge beam, the middle-section lower edge beam and the rear-section lower edge beam respectively, and the top of the side wall plate is connected with the upper edge beam.

It can be known from the description that compared with a traditional corrugated side wall structure, the outer side flattening effect is better, wind resistance can be effectively reduced, oil consumption can be reduced, stacking of cargos is facilitated, damage to the goods is reduced, the design purposes of energy conservation and emission reduction of the lightweight carriage are achieved, and the lower side beam is of a slope transition design and is matched with the bottom plate assembly.

Further, each side wall assembly further comprises a steel door frame, an aluminum alloy profile door plate and a lock rod, the steel door frame is riveted with the side wall plate, the aluminum alloy profile door plate is installed in the steel door frame, and the lock rod is arranged on the aluminum alloy profile door plate.

It can be known from the above description that the structure, the number and the installation positions of side doors can be adjusted according to the overall design of the carriage, and preferably, the side doors are arranged at the rear end part.

Referring to FIG. 1 to FIG. 10, in the first embodiment of the present disclosure, the lightweight aluminum alloy carriage comprises a bottom plate assembly 1, and the bottom plate assembly 1 comprises a front end part 2 and a rear end part 3 which are arranged front and back on an axis;

the front end part 2 comprises a transversely arranged aluminum alloy profile bottom plate 21, and the extrusion direction of the transversely arranged aluminum alloy profile bottom plate 21 is perpendicular to the axis of the bottom plate assembly 1; the rear end part 3 comprises aluminum alloy square tube cross beams 31 and a longitudinally arranged aluminum alloy profile bottom plate 32, the aluminum alloy square tube cross beams 31 are perpendicular to the axis of the bottom plate assembly 1, the extrusion direction of the longitudinally arranged aluminum alloy profile bottom plate 32 is parallel to the axis of the bottom plate assembly 1, the longitudinally arranged aluminum alloy profile bottom plate 32 is erected on the aluminum alloy square tube cross beams 32, and the aluminum alloy square tube cross beams 31 are connected with the transversely arranged aluminum alloy profile bottom plate 21.

Referring to FIG. 1 to FIG. 10, in the second embodiment of the present disclosure, the lightweight aluminum alloy carriage comprises a bottom plate assembly 1, side wall assemblies 5, a front wall assembly 6, a rear wall assembly 7 and a top girth assembly 8;

Referring to FIG. 1 to FIG. 5, the bottom plate assembly 1 comprises a front end part 2 and a rear end part 3 which are arranged front and back on an axis; the front end part 2 comprises a transversely arranged aluminum alloy profile bottom plate 21, and the extrusion direction of the transversely arranged aluminum alloy profile bottom plate 21 is perpendicular to the axis of the bottom plate assembly 1; and the rear end part 3 comprises aluminum alloy square tube cross beams 31 and a longitudinally arranged aluminum alloy profile bottom plate 32, the aluminum alloy square tube cross beams 31 are perpendicular to the axis of the bottom plate assembly 1, the extrusion direction of the longitudinally arranged aluminum alloy profile bottom plate 32 is parallel to the axis of the bottom plate assembly 1, the longitudinally arranged aluminum alloy profile bottom plate 32 is erected on the aluminum alloy square tube cross beams 32, and the aluminum alloy square tube cross beams 31 are connected with the transversely arranged aluminum alloy profile bottom plate 21. The rear end part 3 further comprises bottom edge beams 33, the two ends, perpendicular to the axis of the bottom plate assembly 1, of the longitudinally arranged aluminum alloy profile bottom plate 32 are erected on the two parallel bottom edge beams 33 respectively, and the two ends of the aluminum alloy square tube cross beams 31 are erected on the two bottom edge beams 33 respectively.

The transversely arranged aluminum alloy profile bottom plate 21 comprises two or more sets of transversely arranged aluminum alloy profiles 211 which are sequentially spliced along the axis of the bottom plate assembly 1, and the longitudinally arranged aluminum alloy profile bottom plate 32 comprises two or more sets of longitudinally arranged aluminum alloy profiles 321 which are sequentially spliced along the axis perpendicular to the bottom plate assembly 1. An inner cavity of each set of transversely arranged aluminum alloy profiles 211 is separated into two or more independent cavities through separation ribs 212. The end of one set of transversely arranged aluminum alloy profiles 211 is provided with a first supporting part, and the end of the other set of transversely arranged aluminum alloy profiles 211 is provided with a second supporting part supported outside the first supporting part. Each set of longitudinally arranged aluminum alloy profiles 321 comprises a supporting plate and supporting ribs 322 arranged on the end face, facing the aluminum alloy square tube cross beams 31, of the supporting plate, and the cross sections of the supporting ribs 322 are T-shaped.

The front end part 2 and the rear end part 3 are arranged in a stepped surface mode, the front end part 2 is located on the high surface of the stepped surface, the rear end part 3 is located on the low surface of the stepped surface, and the front end part 2 is connected with the rear end part 3 through an inclined connecting part 4. The inclined connecting part 4 comprises a first bent plate 41, a second bent plate 42, an aluminum alloy inclined frame 44 and two or more sets of inclined aluminum alloy profiles spliced end to end, the extrusion directions of the inclined aluminum alloy profiles 43 are perpendicular to the axis of the bottom plate assembly 1, the transversely arranged aluminum alloy profiles 211 are connected with one set of inclined aluminum alloy profiles 43 through the first bent plate 41, and the longitudinally arranged aluminum alloy profiles 321 are connected with the other set of inclined aluminum alloy profiles 43 through the second bent plate 42. The front end part 2 further comprises an aluminum alloy transverse frame 22 arranged at the ends, close to the inclined connecting part 4, of the transversely arranged aluminum alloy profiles 211, the cross section of the aluminum alloy transverse frame 22 is U-shaped, one end of the aluminum alloy inclined frame 44 is connected with the aluminum alloy transverse frame 22, the other end of the aluminum alloy inclined frame 44 is connected with the aluminum alloy square tube cross beams 31, and the inclined aluminum alloy profiles 43 are erected on the aluminum alloy inclined frame 44.

Figure 1:
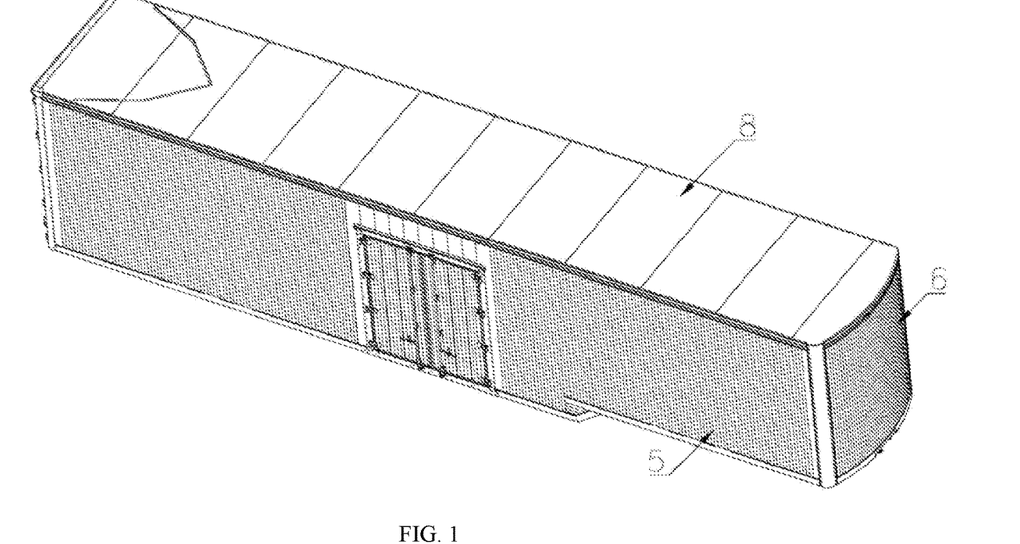
FIG. 1 is a structural schematic diagram of a lightweight aluminum alloy carriage in the embodiment of the present disclosure.
Figure 2:
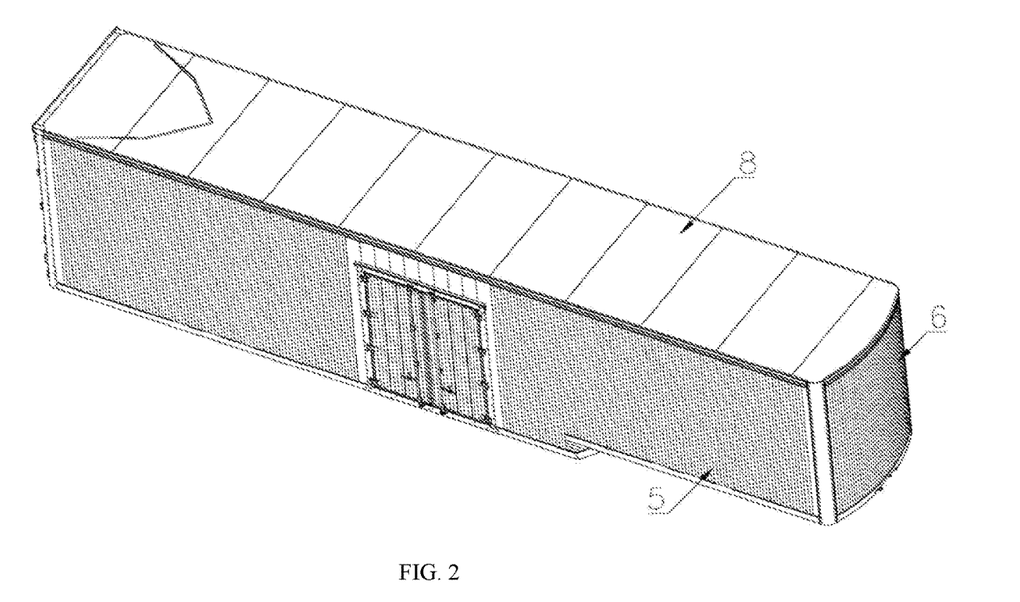
FIG. 2 is an explosive view of the lightweight aluminum alloy carriage in the embodiment of the present disclosure.
Figure 3:
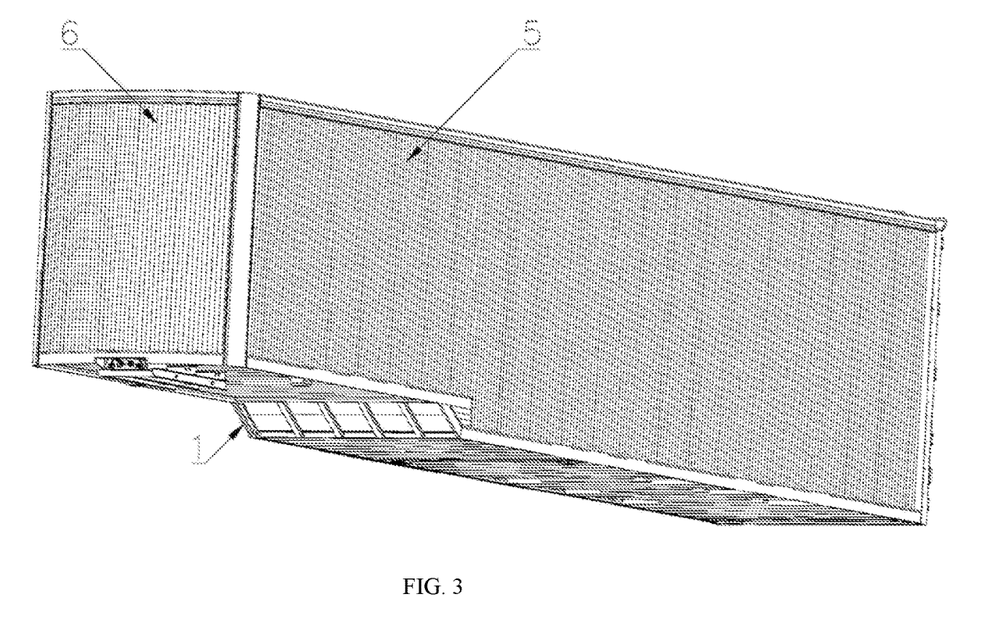
FIG. 3 is another structural schematic diagram of the lightweight aluminum alloy carriage in the embodiment of the present disclosure.
Figure 4:
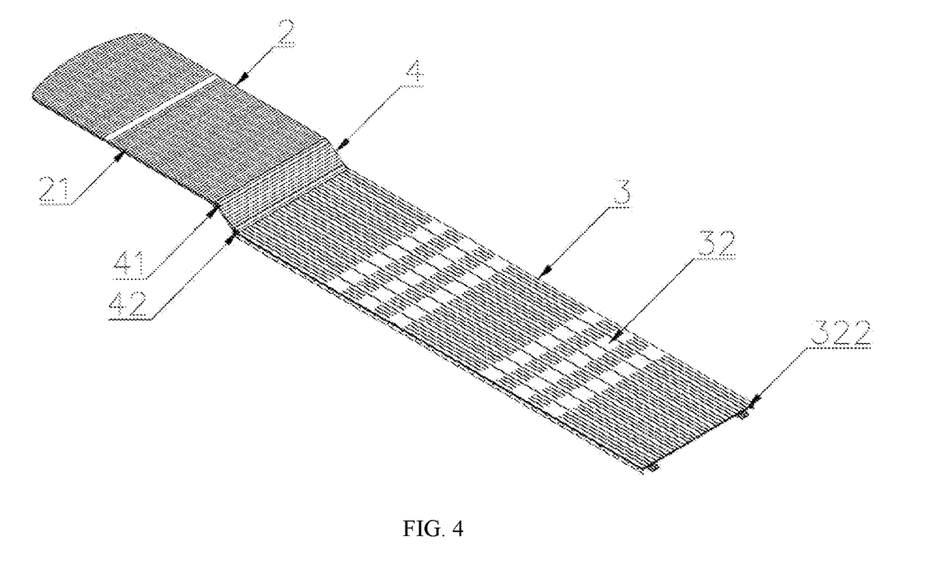
FIG. 4 is a schematic structural diagram of a bottom plate assembly in the embodiment of the present disclosure.
Figure 5:
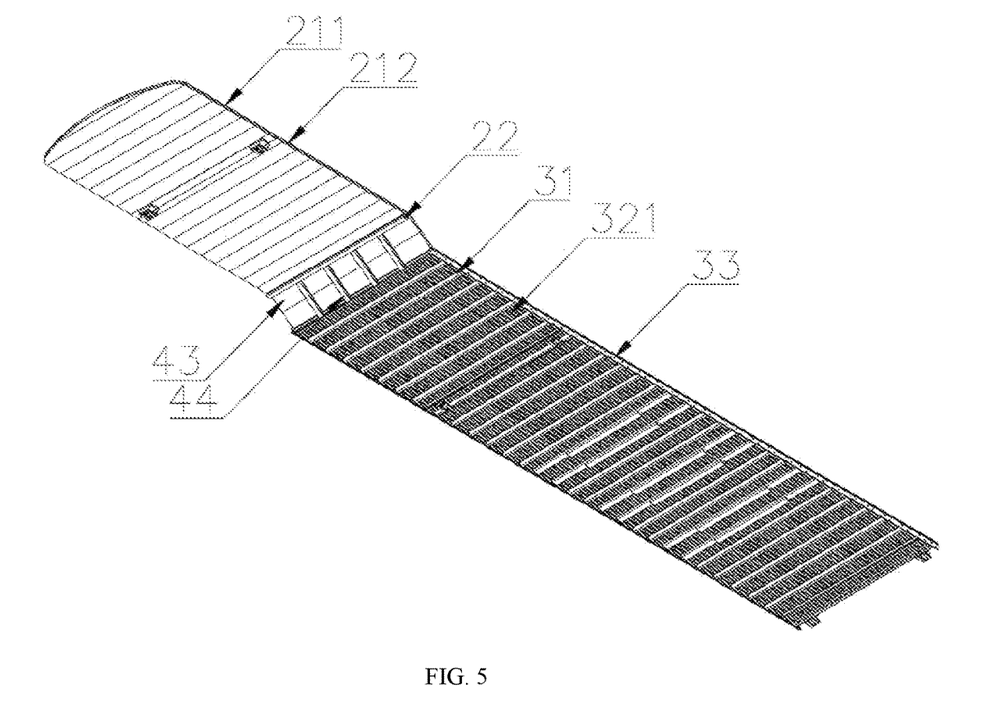
FIG. 5 is another schematic structural diagram of the bottom plate assembly in the embodiment of the present disclosure.
Figure 6:
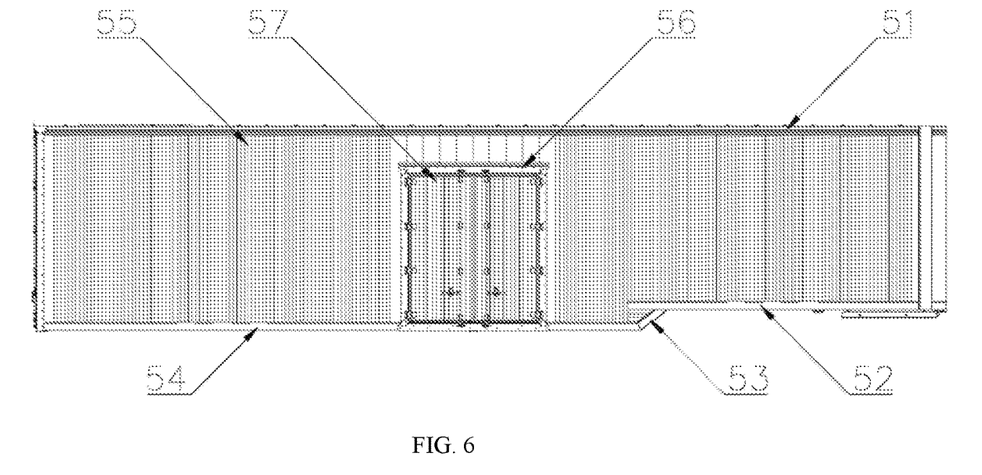
FIG. 6 is a front view of the lightweight aluminum alloy carriage in the embodiment of the present disclosure.
Figure 7:
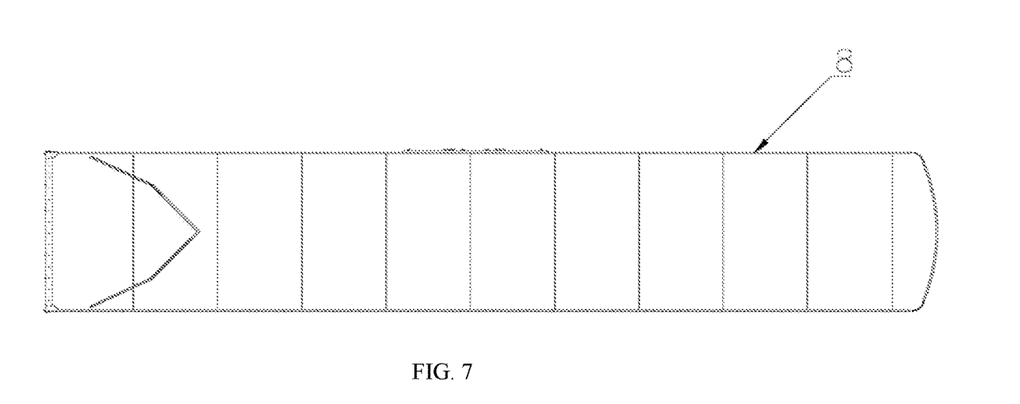
FIG. 7 is a top view of the lightweight aluminum alloy carriage in the embodiment of the present disclosure.
Figure 8:
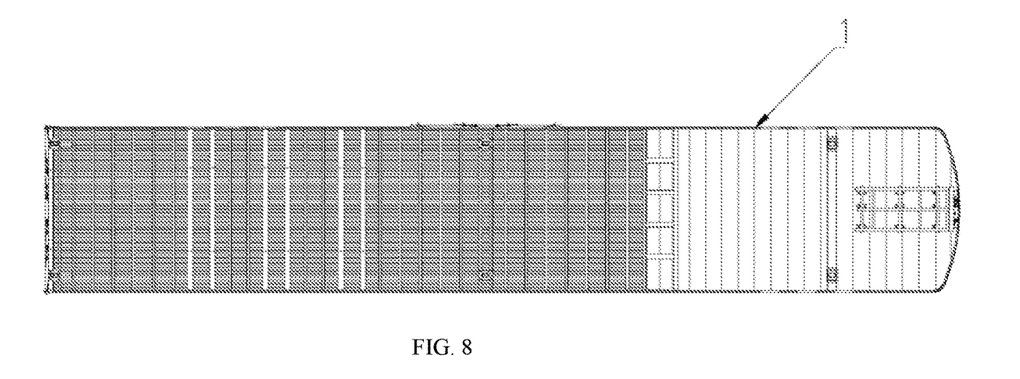
FIG. 8 is an upward view of the lightweight aluminum alloy carriage in the embodiment of the present disclosure.
Figure 9:
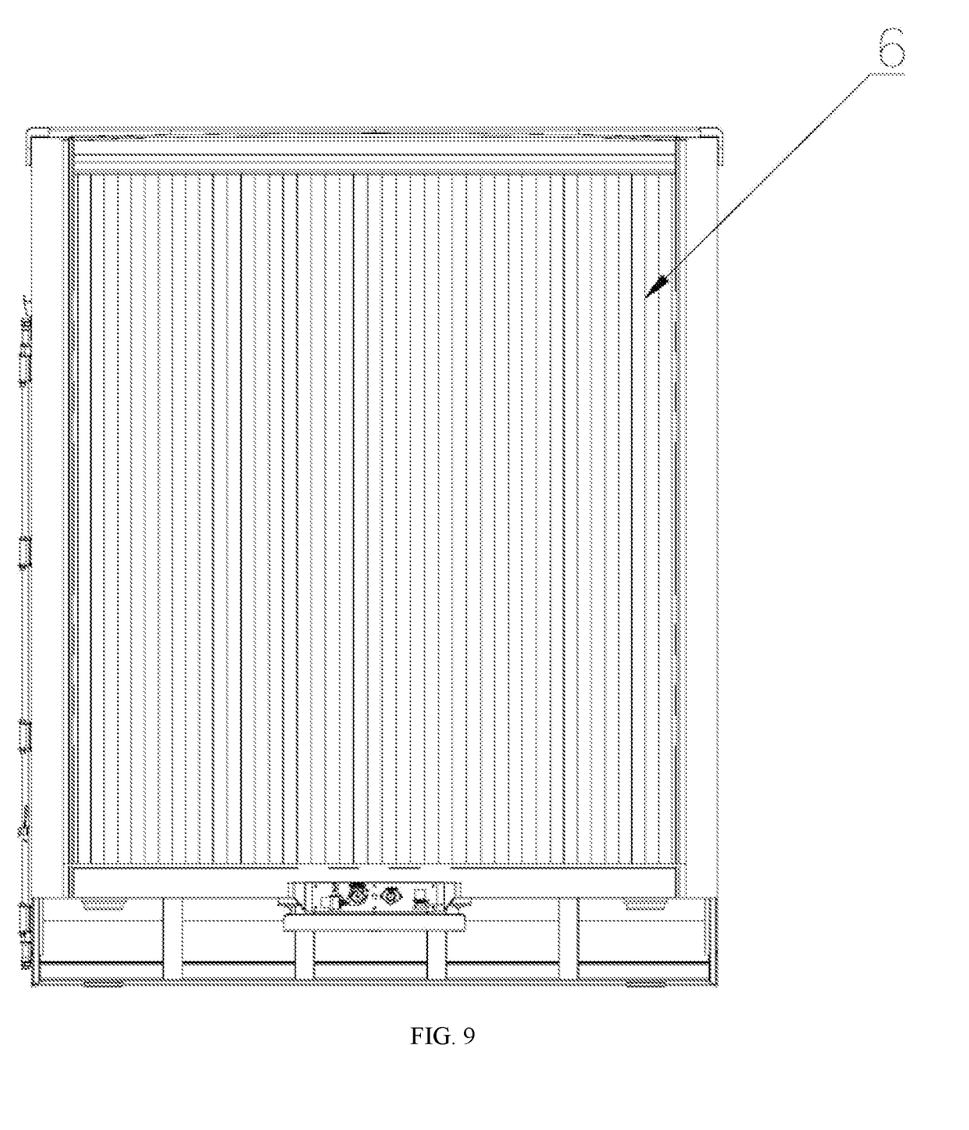
FIG. 9 is a front view of the lightweight aluminum alloy carriage in the embodiment of the present disclosure.
Figure 10:
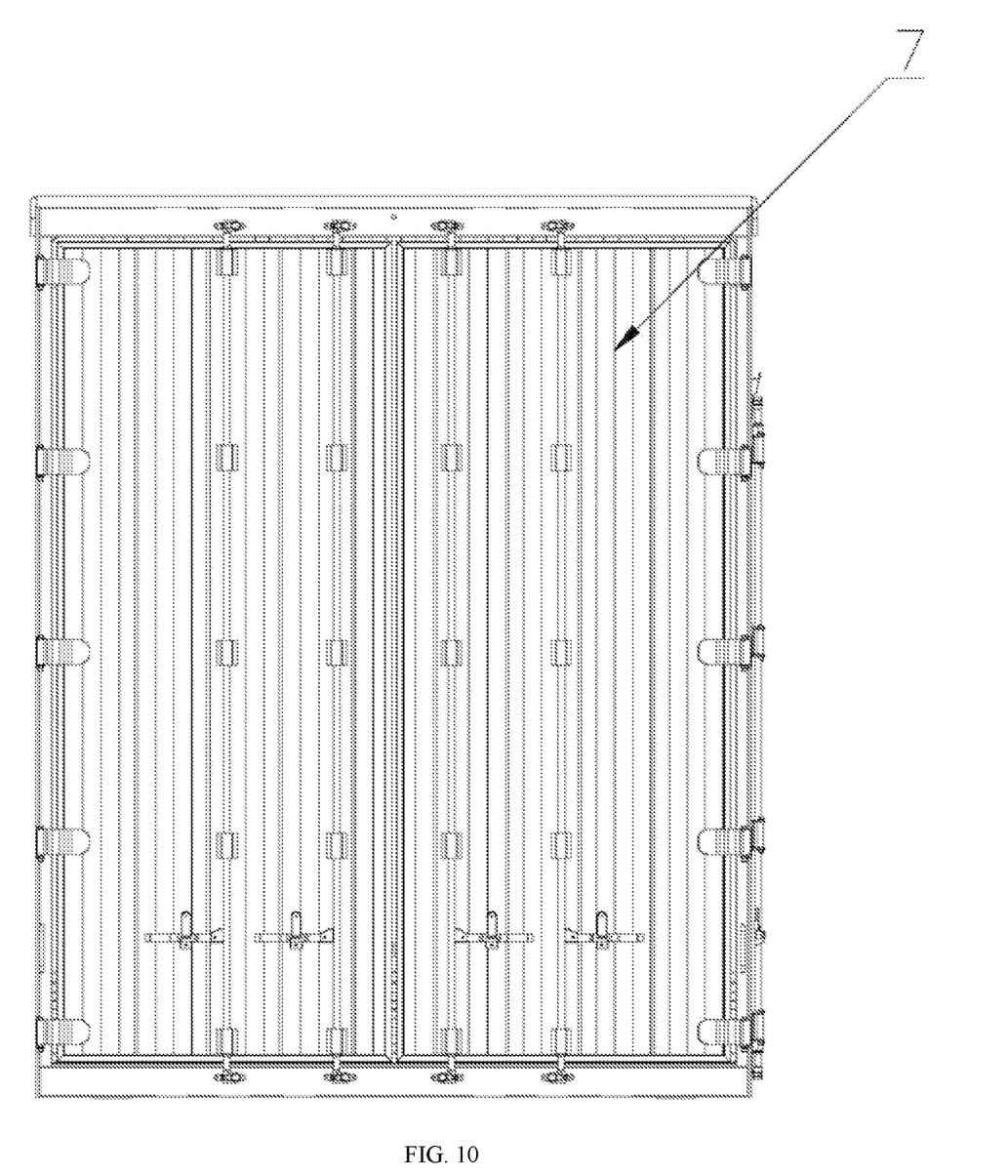
FIG. 10 is a rear view of the lightweight aluminum alloy carriage in the embodiment of the present disclosure.

Referring to FIG. 6, each side wall assembly 5 comprises an upper edge beam 51, a front-section lower edge beam 52, a middle-section lower edge beam 53, a rear-section lower edge beam 54, a side wall plate 55, a steel door frame 56, an aluminum alloy profile door plate 57 and a lock rod, the upper edge beam 51, the front-section lower edge beam 52, the middle-section lower edge beam 53, the rear-section lower edge beam 54 and the side wall plate 55 are in welded connection, the front-section lower edge beam 52 is arranged at the end, perpendicular to the axis of the bottom plate assembly 1, of the front end part 2, the rear-section lower edge beam 54 is arranged at the end, perpendicular to the axis of the bottom plate assembly 1, of the rear end part 3, the middle-section lower edge beam 53 is arranged at the end, perpendicular to the axis of the bottom plate assembly 1, of the inclined connecting part 4, the two ends of the middle-section lower edge beam 53 are connected with the front-section lower edge beam 52 and the rear-section lower edge beam 54 respectively, the side wall plate 55 is parallel to the axis of the bottom plate assembly 1, the bottom of the side wall plate 55 is connected with the front-section lower edge beam 52, the middle-section lower edge beam 53 and the rear-section lower edge beam 54 respectively, and the top of the side wall plate 55 is connected with the upper edge beam 51. The steel door frame 56 is riveted with the side wall plate 55, the aluminum alloy profile door plate 57 is installed in the steel door frame 56, and the lock rod is arranged on the aluminum alloy profile door plate 57.

Referring to FIG. 7 to FIG. 10, the front wall assembly 6 comprises an arc-shaped front wall plate, a front edge beam and wrap angle stand columns, the front wall plate is connected with the transversely arranged aluminum alloy profile bottom plate 21 through the front edge beam, the front wall plate is connected with the side wall plates 55 through the wrap angle stand columns, the front wall plate is an cambered surface, the carriage volume can be increased, wind resistance can be reduced, and the effects of energy conservation and emission reduction are achieved. The rear wall assembly 7 comprises a rear door frame, a rear door plate and an on-door assembly, the rear door frame is connected with the side wall plate 55, the rear door plate is arranged in the rear door frame, and the on-door assembly is arranged on the rear door plate and comprises a handle, a door seal and a lock. The top girth assembly 8 comprises an arc rod, an aluminum plate and top layer skin, the arc rod is riveted with the upper edge beam 51, the aluminum plate is glued with the arc rod, the top layer skin is formed by assembling a plurality of independent bent skin plates in a split mode, the arc rod is connected in an inserted and butt joint mode, a seam is sealed through a sealant, and therefore the overall sealing effect of a carriage body is achieved. The aluminum alloy carriage further comprises corner fittings installed on the bottom plate assembly 1, a traditional standard corner fitting is redesigned into a structure that a steel plate and a cross beam are connected through bolts, and the purpose of weight reduction is further achieved.

In conclusion, compared with a traditional structure that an upper berth bottom plate is supported by bottom cross beams and bottom longitudinal beams in a staggered mode, the bottom plate assembly comprises a front end part and a rear end part which are arranged front and back on the axis, the front end part is designed to be of a cross-beam-free transverse berth bottom plate structure; one-time formed extruded aluminum alloy profiles are adopted, the function and strength requirements of the cross beams and the bottom plate are met, the process difficulty of production and manufacturing is greatly reduced, the production cycle is shortened, the carriage combination efficiency is improved, particularly under the conditions that the overall lightweight design effect of the carriage is better and the cargo carrying capacity is equivalent, the carriage is greatly lightened, the logistics transportation efficiency is greatly improved, the rear end part adopts the structure that the square tube cross beams are erected on the longitudinally arranged profile bottom plate, and the square tube cross beams are used on the carriage for the first time, so that better lightweight design conditions are brought, and the carriage has the advantage that the carriage is easy in production, processing and installation; moreover, the stability of a rear section structure of the carriage is improved; and in cooperation with the longitudinally arranged aluminum alloy profile bottom plate, the loading capacity and the anti-deformation and anti-impact capacity of the carriage are improved, and the safety is guaranteed while the logistics transportation efficiency is improved. The transversely arranged profile bottom plate and the longitudinally arranged profile bottom plate are formed by mutually splicing the aluminum alloy profiles with profile sections subjected to special design, the two kinds of aluminum alloy profiles with the extrusion directions perpendicular to each other are used for the front end part and the rear end part of the carriage respectively, the stress conditions of the front end part and the rear end part of the carriage are improved while the lightweight design purpose is achieved, and the overall loading capacity and the anti-impact and anti-deformation capacity of the carriage are improved. An inner cavity of each set of transversely arranged aluminum alloy profiles comprises a plurality of independent cavities, and the lightweight effect of the front end of the carriage is further improved while the loading capacity of the profiles is met. The longitudinally arranged aluminum alloy profiles adopt the structural design that the supporting plate is fixed to the square tube cross beams through the supporting ribs, the weight of the rear end part of the carriage is greatly reduced, the structure is stable, and the rear section of the carriage is easy to install. It can be known from the description that the front end part and the rear end part form the stepped surface and are connected through the inclined connecting part, so that compared with a traditional vertical transition connecting structure, a loading and unloading trolley can conveniently pass through the stepped surface during cargo loading and unloading, more importantly, the volume in the box can be increased so as to increase the loading space, and then the logistics transportation efficiency is improved. The inclined aluminum alloy profiles and the transversely arranged aluminum alloy profiles are the same and are easy to produce and replace, the inclined aluminum alloy profiles are connected with the transversely arranged aluminum alloy profiles and the longitudinally arranged aluminum alloy profiles through the two bent plates, the structure is stable, and assembling and disassembling are rapid. The aluminum alloy inclined frame is supported below the inclined aluminum alloy profiles, and the effects of connecting the front section and the rear section of the carriage and improving the loading capacity of the carriage are achieved. The bottom edge beams are used for fixing the longitudinally arranged aluminum alloy profile bottom plate and the aluminum alloy square tube cross beams, and the effects of supporting protection and installation simplification are achieved. Compared with a traditional corrugated side wall structure, the outer side flattening effect is better, wind resistance can be effectively reduced, oil consumption can be reduced, stacking of cargos is facilitated, damage to the goods is reduced, the design purposes of energy conservation and emission reduction of the lightweight carriage are achieved, and the lower side beam is of a slope transition design and is matched with the bottom plate assembly. The structure, the number and the installation positions of side doors can be adjusted according to the overall design of the carriage, and preferably, the side doors are arranged at the rear end part.

The above are only the embodiments of the present disclosure and not intended to limit the protection scope of the present disclosure, and any equivalent transformations based on the specification and the accompanying drawings of the present disclosure, which is directly or indirectly applied in other related technical fields, shall similarly fall within the scope of patent protection of the present disclosure.

What is claimed is:

1. A lightweight aluminum alloy carriage, comprising a bottom plate assembly, wherein the bottom plate assembly comprises a front end part and a rear end part which are arranged front and back on an axis;
   the front end part comprises a transversely arranged aluminum alloy profile bottom plate, and an extrusion direction of the transversely arranged aluminum alloy profile bottom plate is perpendicular to the axis of the bottom plate assembly; and
   the rear end part comprises aluminum alloy square tube cross beams and a longitudinally arranged aluminum alloy profile bottom plate, the aluminum alloy square tube cross beams are perpendicular to the axis of the bottom plate assembly, an extrusion direction of the longitudinally arranged aluminum alloy profile bottom plate is parallel to the axis of the bottom plate assembly, the longitudinally arranged aluminum alloy profile bottom plate is erected on the aluminum alloy square tube cross beams, and the aluminum alloy square tube cross beams are connected with the transversely arranged aluminum alloy profile bottom plate.

2. The lightweight aluminum alloy carriage according to claim 1, wherein the transversely arranged aluminum alloy profile bottom plate comprises two or more sets of transversely arranged aluminum alloy profiles which are sequentially spliced along the axis of the bottom plate assembly, and the longitudinally arranged aluminum alloy profile bottom plate comprises two or more sets of longitudinally arranged aluminum alloy profiles which are sequentially spliced along the axis perpendicular to the bottom plate assembly.

3. The lightweight aluminum alloy carriage according to claim 2, wherein an inner cavity of each set of transversely arranged aluminum alloy profiles is separated into two or more independent cavities through separation ribs.

4. The lightweight aluminum alloy carriage according to claim 2, wherein each set of longitudinally arranged aluminum alloy profiles comprises a supporting plate and supporting ribs arranged on an end face, facing the aluminum alloy square tube cross beams, of the supporting plate.

5. The lightweight aluminum alloy carriage according to claim 2, wherein the front end part and the rear end part are arranged in a stepped surface mode, the front end part is located on a high surface of the stepped surface, the rear end part is located on a low surface of the stepped surface, and the front end part is connected with the rear end part through an inclined connecting part.

6. The lightweight aluminum alloy carriage according to claim 5, wherein the inclined connecting part comprises a first bent plate, a second bent plate and two or more sets of inclined aluminum alloy profiles spliced end to end, the extrusion directions of the inclined aluminum alloy profiles are perpendicular to the axis of the bottom plate assembly, the transversely arranged aluminum alloy profiles are connected with one set of inclined aluminum alloy profiles through the first bent plate, and the longitudinally aluminum alloy profiles are connected with the other set of inclined aluminum alloy profiles through the second bent plate.

7. The lightweight aluminum alloy carriage according to claim 5, wherein the inclined connecting part further comprises an aluminum alloy inclined frame, the front end part further comprises an aluminum alloy transverse frame arranged at the ends, close to the inclined connecting part, of the transversely arranged aluminum alloy profiles, one end of the aluminum alloy inclined frame is connected with the aluminum alloy transverse frame, the other end of the aluminum alloy inclined frame is connected with the aluminum alloy square tube cross beams, and the inclined aluminum alloy profiles are erected on the aluminum alloy inclined frame.

8. The lightweight aluminum alloy carriage according to claim 5, wherein the rear end part further comprises bottom edge beams, the two ends, perpendicular to the axis of the bottom plate assembly, of the longitudinally arranged aluminum alloy profile bottom plate are erected on two parallel bottom edge beams respectively, and the two ends of the aluminum alloy square tube cross beams are erected on the two bottom edge beams respectively.

9. The lightweight aluminum alloy carriage according to claim 8, wherein the lightweight aluminum alloy carriage further comprises side wall assemblies, each side wall assembly comprises an upper edge beam, a front-section lower edge beam, a middle-section lower edge beam, a rear-section lower edge beam and a side wall plate, the front-section lower edge beam is arranged at the end, perpendicular to the axis of the bottom plate assembly, of the front end part, the rear-section lower edge beam is arranged at the end, perpendicular to the axis of the bottom plate assembly, of the rear end part, the middle-section lower edge beam is arranged at the end, perpendicular to the axis of the bottom plate assembly, of the inclined connecting part, the two ends of the middle-section lower edge beam are connected with the front-section lower edge beam and the rear-section lower edge beam respectively, the side wall plate is parallel to the axis of the bottom plate assembly, the bottom of the side wall plate is connected with the front-section lower edge beam, the middle-section lower edge beam and the rear-section lower edge beam respectively, and the top of the side wall plate is connected with the upper edge beam.

10. The lightweight aluminum alloy carriage according to claim 9, wherein each side wall assembly further comprises a steel door frame, an aluminum alloy profile door plate and a lock rod, the steel door frame is riveted with the side wall plate, the aluminum alloy profile door plate is installed in the steel door frame, and the lock rod is arranged on the aluminum alloy profile door plate.

\* \* \* \* \*